| United States Patent Office | 3,532,269 |
|---|---|
| | Patented Oct. 6, 1970 |

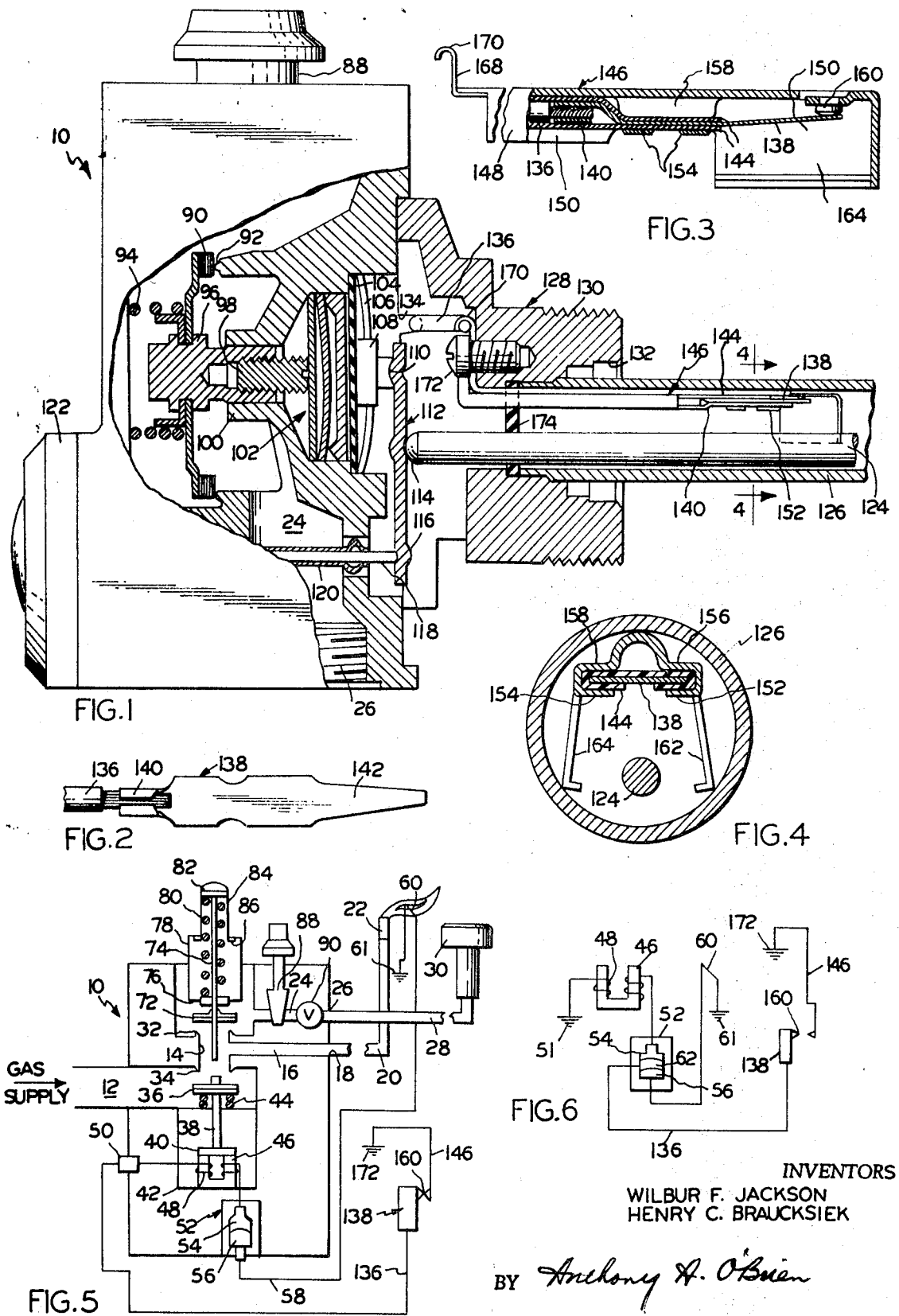

---

3,532,269
DUAL SENSING THERMOSTATIC
CONTROL DEVICE
Wilbur F. Jackson, Rolling Hills, and Henry C. Braucksiek, Buena Park, Calif., assignors to Robertshaw Controls Company, Richmond, Va., a corporation of Delaware
Continuation of application Ser. No. 436,808, Mar. 3, 1965. This application Nov. 14, 1966, Ser. No. 601,267
Int. Cl. F22b *37/42, 37/47*
U.S. Cl. 236—21                                    6 Claims

ABSTRACT OF THE DISCLOSURE

A dual sensing thermostatic control device for controlling fuel flow to burner apparatus has a rod and tube thermostat unit responding to normal temperature conditions for normal control of the fuel flow, a thermoelectric safety shutoff device responding to an unsafe condition for shutting off the fuel flow, and an abnormal temperature sensor responding to an abnormal temperature condition for abnormal control of the fuel flow. The abnormal temperature sensor is disposed in the space between the rod and tube of the normal sensing thermostat unit and includes a bimetal actuated switch electrically connected in the circuit of the thermoelectric safety shutoff device for actuation thereof in response to an abnormal temperature condition.

---

This application is a continuation of application Ser. No. 436,808 filed Mar. 3 1965, now abandoned. The present invention relates to thermostatic control devices and in particular to such a device for preventing dangerously high temperature conditions in a heating appliance such as a hot water heater.

In modern heating appliances, such as domestic hot water heaters, It is standard practice to control a supply of fuel to a main burner and to a pilot burner, with the main burner flow being thermostatically controlled and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube type thermostat.

Explosions from dangerously high temperatures being developed in the hot water tank have presented a problem which has been approached by the prior art. For example, U.S. Pat. No. 2,781,977 includes a lower cycling thermostat and a thermostatic switch that is attached to the upper exterior of the hot water tank and is connected in series with the thermoelectric circuit. While this arrangement presents some protection against abnormal temperature conditions, it includes certain disadvantages such as cost of installation and being responsive only to the temperature at the top of the hot-water tank.

It is, therefore, an object of the present invention to incorporate a separate thermal sensor of the bimetal type in the same structure as the rod and tube thermostat in a control device.

Another object of this invention is to mount an overtemperature responsive bimetal switch means between the rod and tube of a normal temperature responsive thermostat of a control device.

It is another object of this invention to construct a bimetal switch assembly into a compact, simple unit for insertion between the rod and tube of a thermostat unit.

A further object of the present invention is to control the circuit of a thermoelectric safety means in response to a overtemperature sensing bimetal switch means that is integrated with the normal temperature sensing means of a control device.

In accordance with the present invention, a thermostatic control device includes a casing having inlet and outlet means with a flow passage therebetween, control means in the passage movable between controlling positions, normal temperature sensor means carried by the casing, and including a rod and tube thermostat unit, an operative connection between the normal temperature sensor means and the control means for moving the same between its controlling positions, thermoelectric means including safety shutoff means in the passage and an electromagnetic device adapted to be energized for holding the shutoff means in an open position, thermoelectric circuit means for energizing the electromagnetic device, and abnormal temperature sensor means including bimetal switch means disposed in the rod and tube thermostat unit and electrically connected in the circuit means for deenergizing the electromagnetic device in response to a predetermined abnormal temperature condition.

Other objects and advantages of the present invention will become apparent from the following description of a preferred embodiment, taken in connection with the accompanying drawing wherein:

FIG. 1 is a side elevation with parts broken away and parts in section of a control device embodying the present invention;

FIG. 2 is a partial plan view of a detail of FIG. 1;

FIG. 3 is a side elevation of a detail of FIG. 1 with parts broken away and parts in section:

FIG. 4 is a cross section taken along the line 4—4 of FIG. 1;

FIG. 5 is a schematic diargram of a fuel burner control system embodying the device of FIG. 1; and FIG. 6 is a schematic wiring diagram of a modification of FIG. 5.

As is illustrated in FIGS. 1 and 5, the control device 10 has an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 leading to a main flow outlet port 26 which communicates with a conduit 28 for supplying fuel to a main burner 30.

The pilot flow passage 16 communicates with the common passage 14 intermediate its opposite ends which define a downstream valve seat 32 and an upstream valve seat 34 that is controlled by thermoelectric safety means. As is shown in FIG. 5, the thermoelectric safety means includes a safety shutoff valve member 36 movably disposed for cooperation with the valve seat 34. The valve member 36 is fixed to one end of an armature stem 38 which has its other end fixed to an armature 40 located in a fixed magnet housing 42 so that the stem 38 is slidably disposed relative to the housing 42. A coil spring 44 surrounds one end of the armature stem 38 and is mounted in compression between the end of the magnet housing 42 and the rear surface of the valve member 36 which is thus biased to a closed position against the valve seat 34. The valve member 36, stem 38 and armature 40 reciprocate as a unit between released and attracted positions relative to fixed electromagnetic means in the form of a generally U-shaped magnet core 46 and an electric coil 48 wound thereon. The magnet core 46 is secured in the magnet housing 42 by any suitable means and the energizing coil 48 has one end connected to an insulated connector 50 and its other end connected to a thermocouple cable connector 52.

The thermocouple cable connector 52 includes a seat member 54 having one end connected to the lead of coil 48 and its other end provided with an arcuate seat and a head member 56 having one end provided with a conforming arcuate ead member and its other end connected to a thermocouple cable 58. The thermocouple cable 58 is connected to the thermocouple 60 which is positioned in the flame of the pilot burner 22 and which has its other lead connected to a ground terminal 61.

The downstream valve seat 32 is controlled by combined reset and valve means which includes a valve member 72 carried adjacent one end of a reset stem 74. Such one end of the stem 74 is disposed for movement through the passage 14 to engage the safety valve member 36. The opposite end of the stem 74 extends through a sealing collar 76 on a plunger housing 78, in which a coil spring 80 encircles the stem 74 and is mounted in compression between the collar 76 and a disc 82 on the end of the stem 74. The stem 74 is retained in the housing 78 by means of a hollow push button 84 which receives the stem disc 82 and which includes an annular bottom flange 86 engaging the housing wall surrounding an opening therefor.

The main flow of fuel from the valve seat 32 is controlled by a manually operable on-off valve 88 which may be conventional tapered plug cock disposed in the main flow passage 24. Downstream of the tapered valve 88, the main flow of fuel is thermostatically controlled by a valve 90 which is operatively disposed in the main flow passage 24 just ahead of the main outlet 26.

As is shown in FIG. 1, the wall defining the main flow passage 24 is provided with an annular valve seat 92, toward which the valve disc member 90 is biased by a coil spring 94 mounted in compression between the surface of valve member 90 and an internal wall surface of the casing 10. A valve stem 96 has one end suitably connected to valve member 90 and a free end with an adjustable set screw 98 projecting through a bushing 100 formed in a rear wall of casing 10 to extend into engagement with actuating means 102. The actuating means is a conventional snap acting mechanism in which a clicker disc moves from an inoperative to an operative position through an over center position with a snap action in response to an applied operating force. The snap acting actuator means 102 is retained in an exterior recess formed in the rear wall of casing 10 by means of a seal-retainer assembly including a diaphragm seal 104 and a bowed washer 106 which is pressed fitted into the exterior recess. The operating force is applied by means of an operating button 108 extending through the opening of the washer 106 to engage the diaphragm seal 104.

The operating button 108 abuts a suitable projection 110 formed adjacent one end of an operating lever 112 which has an intermediate recess 114 receiving the rod end of a rod and tube type thermostat; a recess 116 formed adjacent the other end of the operating lever 112 receives the end of an adjusting shaft 118. The adjusting shaft 118 is axially movable in a sleeve 120 which extends across the passage 24 and sealed at both ends; the opposite end of the shaft 118 abuts an adjusting screw (not shown) which is threaded through the front wall of casing 10 and which carries a temperature selection knob 122 on its external end. With such an arrangement it is now apparent that rotation of the temperature selection knob 112 through a selective range of temperature settings will change the relative position of the operating lever 112 whereby the temperature at which the rod and tube thermostat effects actuation of the snap acting mechanism 102, will be determined by the present position of the lever 112.

The thermostat for actuating the lever 112 is a rod and tube type in which a rod 124 of relatively nonexpendable material, such as Invar, is longitudinally disposed off center in a tube 126 of relatively expandable material, such as copper. The free ends of the rod 125 and tube 126 are integrated by any suitable means such as hollow bolt (not shown) disposed in the annular space between the rod and tube and threadedly engaging both the rod and tube; the mounting end of tube 126 is secured as by threads to a mounting shank 128 which is attached to the rear wall of casing 10 as by threaded bolts (not shown). The end of mounting shank 128 includes external threads 130 for threading the assembly through the wall of a hot water tank (not shown) and an internal recess 132 coextensive with the tube 126; with such arrangement, substantially the entire length of the tube 126 is disposed in the hot water resulting in a more accurate and faster response of the rod and tube assembly.

As is shown in FIG. 1, the mounting shank 128 includes a notched recess 134 along its casing wall to receive the insulated conductor 136, one end of which is connected to the insulated connector 50. The other end of the conductor 136 is electrically connected to the bimetal switch assembly located between the rod 124 and the tube 126. An elongated operating lever in the fom of a bimetallic conductor blade 138 has opposed arcuate portions 140 on one end, which are crimped around the wire end of the conductor 136. The bimetal lever 138 has a tapered free end 142 which is adapted to flex downwardly, as viewed in FIG. 1, in response to a predetermined maximum temperature. Except for its movable end 142, the bimetal lever 138 is surrounded by an electrical insulating covering 144 as is shown in FIG. 3.

An elongated mounting bracket, indicated generally at 146 is made of electrical conductive material, such as brass, to define a grounding conductor. The bracket 146 has an inverted U-shaped configuration defined by a pair of depending leg members 148 and 150 between which the bimetal lever 138 and the connected end of the insulated conductor 136 are nested. Intermediate their ends, the lower portion of leg members 148 and 150 are provided with a pair of spaced tabs 152 and 154, respectively; as is illustrated in FIGS. 3 and 4, the upper parts of the two leg members 148 and 150 are flattened at 156 and 158, respectively. The flattening operation is accomplished during assembly as by crimping whereby the flattened parts 156 and 158 are in opposed relation to the tabs 152 and 154, respectively, to form a unitary assembly including the connected end of conductor 138, the bimetal lever 138 and the conducting bracket 146. The insulating cover 144 electrically insulates the bimetal lever 138 from the bracket 146 including the clamping parts thereof.

As is illustrated in FIG. 3, the top portion of the bracket 146 is deformed downwardly adjacent its right hand end to provide a mounting tab for a contact 160 to be engaged by the free end 142 of bimetal 138; this deformable tab for contact 160 may be bent upwardly or downwardly for calibration purposes. The right hand end of bracket 146 constitutes an enclosure for the bimetal end 142; in this area, the leg portion 148 and 150 have elongated diverging tabs 162 and 164, respectively. The tabs 162 and 164 are in opposed relation to each other and engage the lower portion of tube 126 to retain the switch assembly adjacent the top inner wall of tube 126 while maintaining a positive clearance between the switch assembly and the off center rod 124.

As viewed in FIGS. 1 and 3, the left hand end of bracket 146 has an upward bent lug 168, the terminal portion of which is semicircular in cross section to define a retaining clamp 170 for part of the insulated conductor 136. The lug 168 is apertured to receive a grounding screw 172 that is threaded into an internal wall of the mounting shank 128 for securely fastening the bimetal switching assembly thereto. With the above arrangement, the bimetal switching assembly is fabricated as a unitary assembly and is fastened by the grounding screw 172 into a predetermined location in the space between the off center rod 124 and the tube 126 without being attached thereto and without interfering with the normal operation of the rod and tube thermostat unit. In order to protect the switching assembly from dust and other contamination collecting on the switch contact, a seal plug 174 of rubber or any other suitable material, is disposed in the mounting shank 128 at the position where the tube 126 is threaded therein. The plug 174 is suitably apertured to receive the off center rod 124 and the switching assembly.

To place the system of FIGS. 1 and 5 in operation, the manual valve 88 is rotated to an on position and the temperature setting dial 122 is rotated to a selected temperature, e.g., 140° F. for conventional hot water heaters. The reset button 84 is manually depressed whereby the valve member 72 is closed on valve seat 32 to prevent any fuel flow through the main flow passage 24 and whereby the reset stem 74 moves the valve member 36, stem 38 and armature 40 as a unit against the bias of coil spring 44 to an attracted or valve open position permitting a fuel flow through the pilot flow passage 16 to the pilot burner 22 where it is ignited as by a match. As soon as the thermocouple 60 is heated sufficiently by the pilot burner flame to energize the holding electromagnetic means, core 46 and coil 48, the push button may be released whereby the armature 40 is held in its attracted position and both valve seats 32 and 34 are open. Inasmuch as the rod and tube thermostat is in its contracted state, the valve member 90 is open, permitting fuel flow to the main burner 30 which is ignited by the flame of the pilot burner 22.

As the water temperature increases, the tube 126 expands and, since the tube 126 is fixed at its inner end to the mounting shank 128, the tube expands longitudinally in the direction away from the mounting shank 128; the nonexpanding rod 124 is pulled to the right, as viewed in FIG. 1, by the expanding tube 126 thus decreasing the applied force on the operating lever 112. When the water temperature reaches 140° F., the applied force on the operating button 108 is reduced to the point where the snap mechanism 102 returns to its position shown in FIG. 1 permitting the valve member 90 to be closed by its return spring 94; the main fuel flow is thus cut off and the main burner 30 is extinguished. A subsequent decrease in the water temperature, as when the hot water is drawn off and replenished with cold water, causes contraction of the tube 126 whereupon the main valve 90 is again opened. During normal operation, the main burner 30 will be cycled thermostatically as outlined above to maintain the water temperature at 140° F.

Should the flame at the pilot burner 22 be extinguished from any cause, the thermocouple 60 will cool and the thermoelectric current to the coil 48 will cease; thereupon the armatures 40 will be released from the magnet core 46 under the bias of the coil spring 44 which closes the valve member 36 on the valve seat 34 to effect 100% shut off of any fuel flow. In order to place the system in operation again, the resetting procedure outlined above must be repeated.

In accordance with the present invention, a thermostatic device is integrally provided with a separate thermally responsive means to prevent excessively high water temperature that could cause explosion of the hot water tank. In the event the water temperature increases to a dangerously high temperature in the range of above 210° F. due to some malfunction which keeps the main burner in operation, the free end 142 of the bimetal 138 flexes downwardly to separate from the contact 160. The bimetal 138 may be designed to flex at other critical temperatures, depending on the type of the heating appliance and its operating characteristics. When the contact 160 is mated with the bimetal end 142 the thermoelectric circuit may be traced as follows: from ground 61 through the thermocouple 60, the connector 52, the coil 48, the connector 50, the conductor 136, the bimetal 138, the contact 160, and the conductive bracket 146 to the grounding screw 172. When the bimetal 138 is flexed away from the contact 160, the thermoelectric circuit is broken and the electromagnetic coil 48 is deenergized causing release of the armature 40 whereby the valve member 36 is closed to effect 100% shut off of any fuel flow as described above. As soon as the water temperature decreases to its normal operating range, the contact 160 is again mated with the bimetal end 142, however, to commence operation of the system, the resetting procedure must be repeated as outlined above.

The rod and tube thermostat unit constitutes normal temperature responsive means for effecting thermostatic cycling of the main control means including the valve 90 which is thus moved between controlling positions corresponding to first and second temperature conditions. In the event the main control means fails to cycle properly, the water temperature may be increased to an abnormal or critical temperature condition. Then the abnormal temperature responsive means, constituted by the thermally responsive bimetal in the rod and tube, is flexed to cause opening of the thermoelectric circuit which exercises supervisory control of the main control means whereby the system is shut down.

While the above operation has been described in connection with a circuit breaking system, it is to be understood that the bimetal element may also be used to close a normally open switch in a grounding or shorting circuit. Such a grounding circuit is shown in FIG. 6 wherein the conductor 136 is connected to an arcuate conductor 62 between the seat and head members 54 and 56 of the conductor 52. In addition, the lead of the electromagnetic coil 48 is connected to a ground terminal 51. With such an arrangement, the abnormal temperature condition would flex the bimetal end 142 into engagement with the contact 160 whereby the thermoelectric circuit is shorted from the arcuate conductor 62 through the switch assembly to the ground screw 172; the thermoelectric current flow through the electromagnetic coil 48 is thus reduced sufficiently to cause release of the armature 40 and closure of the valve member 36.

Inasmuch as the preferred embodiment of the present invention is subject to many variations, modifications and changes in details, it is intended that all matter contained in the foregoing description or shown on the accompanying drawings shall be interpreted as illustrative and not in a limiting sense.

What is claimed is:
1. In a thermostatic control device, the combination comprising
   a casing having inlet and outlet means and flow passage means therebetween,
   control means in said passage means movable between controlling positions,
   a normal temperature thermostat unit carried by said casing and including a rod and tube of different thermally responsive materials with the rod being spaced from the tube along its length,
   means defining an operative connection between said normal temperature thermostat unit and said control means for moving the same between controlling positions,
   thermoelectric means including safety shutoff means in said passage means and electromagnetic means adapted to be energized for holding said safety shutoff means in an open position, thermoelectric circuit means for energizing said electromagnetic means, and
   abnormal temperature sensor means including bimetal switch means disposed in the space between the rod and tube of said thermostat unit and electrically connected in said circuit means for deenergizing said electromagnetic means in response to a predetermined abnormal temperature condition, said bimetal switch means comprising a conductive bimetal lever and a conductive grounding bracket having clamping means for carrying said bimetal lever, 2. In a thermostatic control device, the combination comprising a casing having inlet and outlet means and flow passage means therebetween, control means in said passage means movable between controlling positions, a normal temperature thermostat unit including a rod and tube of different thermally responsive material with the rod being spaced from the tube along its length, mounting shank means for securing said normal temperature thermostat unit to said casing, means defining an operative connection between said normal temperature thermostat unit and said control means for moving the same between controlling positions, safety shutoff means in said passage means movable between open and closed positions, electromagnetic holding means energizable to hold said safety shutoff means in an open position, thermoelectric circuit means for energizing said electromagnetic holding means, bracket means carried by said shank means and extending into the space between the rod and the tube of said thermostat unit, and switching means including a bimetal blade and being electrically connected to said circuit means for de-energizing said electromagnetic holding means in response to an abnormal temperature condition, said bimetal blade having a portion covered by insulation and being clamped to said bracket means.

3. The combination as recited in claim 2 wherein said bracket means comprises a conductive bracket having a U-shaped cross section and a mounting lug on one end, and a grounding terminal fastening said lug to said shank means.

4. The combination as recited in claim 2 wherein the rod of said thermostat unit is longitudinally disposed in said tube off center from the longitudinal axis of said tube.

5. In a thermally responsive device, the combination comprising a tubular element, a rod element extending within said tubular element in spaced relation thereto, said rod and tubular elements having different coefficients of thermal expansion to define a rod and tube thermostat unit responsive to normal temperature conditions, bimetal switch means disposed in said tubular element to define a second thermostat unit responsive to abnormal temperature conditions, said bimetal switch means including a mounting bracket, a bimetallic lever, and clamping means integrating said bracket and said lever whereby said switch means may be assembled as a unit in said tubular element, said rod element being disposed longitudinally off center from the longitudinal axis of said tubular element.

6. The combination as recited in claim 5 wherein said mounting bracket has a U-shaped cross section and said bimetallic lever is disposed therein and wherein said clamping means comprises bent tabs integrally formed on said mounting bracket.

References Cited

UNITED STATES PATENTS

| | | | |
|---|---|---|---|
| 2,300,092 | 10/1942 | Baum | 236—68 |
| 2,312,479 | 3/1943 | Ray | 236—21 |
| 2,987,919 | 6/1961 | Kirby | 236—21 |
| 3,231,193 | 1/1966 | Coffey | 236—21 |
| 3,286,923 | 11/1966 | Jackson et al. | 236—21 |
| 3,291,390 | 12/1966 | Solomon | 236—21 |

EDWARD J. MICHAEL, Primary Examiner